United States Patent Office 2,757,064
Patented July 31, 1956

2,757,064

POLYESTER FIBERS DYED WITH ANTHRAQUINONE DYES

Stanley B. Speck, Wilmington, Del., assignor to E. I. du Pont de Nemours and Company, Wilmington, Del., a corporation of Delaware No Drawing. Application April 16, 1953, Serial No. 349,324

4 Claims. (Cl. 8—39)

This invention relates to dyed polyester fibers, and more particularly to polyethylene terephthalate fibers which are dyed in bright violet shades having good fastness properties.

By the term "polyethylene terephthalate fibers," we refer to the product currently sold on the market under the E. I. du Pont de Nemours and Company trademark "Dacron."

Many of the dyes heretofore used for the dyeing of cellulose acetate have been found useful in the dyeing of the new polyethylene terephthalate fibers, but a number of the dyes of this class which are usually applied by special methods to the polyethylene terephthalate fibers show much poorer fastness properties on the new fiber than they exhibited when applied to cellulose acetate. In general, higher temperatures are used in the application of the dyes to the polyethylene terephthalate fibers, but the reasons why colors which are found to be relatively fast on cellulose acetate show poor fastness on the new fiber has not been explained. The commercial cellulose acetate dyes which dye that fiber in violet shades have been found to be quite fugitive when applied to the polyethylene terephthalate fibers, and while this fiber can be dyed in relatively fast shades by using a mixture of a red and a violet acetate dye, this mixture invariably gives much duller shades than are desirable.

It is therefore an object of the present invention to dye polyethylene terephthalate fibers in bright violet shades which exhibit good fastness properties, particularly to light.

I have found that 1,4-diamino-2,3-dihalogen anthraquinones in which the halogen is of the class consisting of chlorine and bromine dye polyethylene terephthalate fibers in bright violet shades and exhibit good affinity so that strong dyeings may be produced. These dyeings have good fastness properties particularly to light, which is quite unexpected when the known red-violet acetate dye, which is the 1,4-diamino-anthraquinone which dyes cellulose acetate in fast shades, is quite fugitive when applied to polyethylene terephthalate fiber. 1,4-diaminoanthraquinones when applied to cellulose acetate give violet shades, whereas when this is applied to the polyethylene terephthalate fiber it gives very undesirable reddish-blue shades entirely different from the shades which it produces on the cellulose acetate.

The 1,4-diamino-2,3-dihalogen anthraquinones may be applied to the polyethylene terephthalate fiber by the methods described in literature for the application of cellulose acetate dyes to this new fiber, such as those described by W. R. Remington in the article "Principles of Dyeing 'Dacron' Polyester Fiber," American Dyestuff Reporter 41, 860 (1952); by J. W. Gibson et al., "'Thermosol' Method of Dyeing," American Dyestuff Reporter 42, 1 (1953); and in the technical bulletin, Du Pont volume 8, No. 2, page 69, June 1952 under the heading "Dyeing of 'Dacron' Polyester Fiber—Evaluation of Dyeing Assistants." These colors may also be applied by the printing processes. Usually from 0.01% to 2% of the 1,4-diamino-2,3-dihalogen anthraquinones are required to dye the polyethylene terephthalate fiber in pastel to heavy shades.

The following examples are given to illustrate the invention. Parts used are by weight.

Example 1

To a boiling solution of 5 grams of benzoic acid in 250 ml. of water, there is added 0.05 gram of 1,4-diamino-2,3-dichloroanthraquinone dissolved in a small amount of "Cellosolve" (ethylene glycol monoethyl ether) or dimethyl formamide. Then 5 grams of polyethylene terephthalate fiber is added and the solution is kept at the boil for one hour. The fiber is scoured at the boil for 15 minutes in a rinse solution containing 0.5 gram per liter of sodium hydroxide and 1 gram per liter of a long-chain sodium alkyl sulfate. The fiber is colored a bright reddish violet shade which exhibits very good fastness to light, washing and gas fumes.

Other dyestuff assistants (or carriers, as these assistants are sometimes called) may be substituted for the benzoic acid in the above example.

Example 2

By use of high temperatures such as 120° C., under super-atmospheric pressures, 1,4-diamino-2,3-dichloroanthraquinone will dye polyethylene terephthalate fiber in bright red-violet shades with good penetration into the fiber. For example, polyethylene terephthalate fiber is scoured at the boil for 15 minutes with a 0.5% solution of a sulfated fatty alcohol sodium salt. The wet fiber is added to a dye bath containing 0.25% of 1,4-diamino-2,3-dichloroanthraquinone which is dispersed in water and the dye bath is heated for one hour at 120° C. in a suitable pressure vessel. After cooling, the polyethylene terephthalate fiber is scoured with 0.5% of a sulfated fatty alcohol sodium salt for 15 minutes at the boil, using a 40:1 bath-to-fiber volume ratio.

1,4-diamino-2,3-dibromoanthraquinone or 1,4-diamino-2-chloro-3-bromoanthraquinone may be used in the above examples to give dyeings on polyethylene terephthalate of substantially the same shade and fastness properties as that obtained by the 1,4-diamino-2,3-dichloroanthraquinone.

Example 3

A mixed 1,4-diamino-2,3-dihalogen anthraquinone of the general formula:

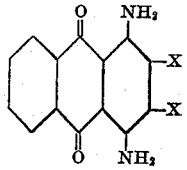

where X=Cl or Br, may be made as follows:

To a suspension of 70 parts of leuco 1,4-diaminoanthraquinone in 384 parts of nitrobenzene at 40° C. there is added dropwise over 2 hours a mixture of 81 parts of sulfuryl chloride and 46 parts of bromine. The temperature is raised to 60° C. and held at that temperature for 2 hours. After cooling and addition of 100 parts of water, the product is separated by filtration, washed with alcohol and dried. The yield is 88 parts. Analysis shows 7.0% N, 12.6% Cl and 16% Br, so that the product appears to be a mixture of 1,4-diamino-2,3-dibromoanthraquinone, 1,4-diamino-2-bromo-3-chloroanthraquinone and 1,4-diamino-2,3-dichloroanthraquinone. This mixture dyes polyethylene terephthalate fiber in a shade very similar to that produced by 1,4-diamino-2,3-dichloroanthraquinone itself, and exhibits the same good fastness properties.

The polyethylene terephthalate fibers to which the present invention relates are those more particularly disclosed in the patent to Winfield and Dickens, U. S. 2,465,319.

I claim:
1. Polyethylene terephthalate fiber dyed with 1,4-diamino-2,3-dihalogen anthraquinone in which the halogen is of the group consisting of chlorine and bromine.
2. Polyethylene terephthalate fiber dyed with 1,4-diamino-2,3-dichloroanthraquinone.
3. Polyethylene terephthalate fiber dyed with 1,4-diamino-2-bromo-3-chloroanthraquinone.
4. Polyethylene terephthalate fiber dyed with 1,4-diamino-2,3-dibromoanthraquinone.

References Cited in the file of this patent
UNITED STATES PATENTS

| 1,776,932 | Shepherdson et al. | Sept. 30, 1930 |

FOREIGN PATENTS

| 211,720 | Great Britain | Feb. 28, 1924 |

OTHER REFERENCES

Meunier, Article in American Dyestuff Reporter, Jan. 22, 1951, pages P51 and P53.